United States Patent [19]

McConaghy, Jr. et al.

[11] Patent Number: 4,718,984
[45] Date of Patent: Jan. 12, 1988

[54] APPARATUS FOR CALCINING COKE

[75] Inventors: James R. McConaghy, Jr.; Charles J. Swartz, both of Ponca City, Okla.

[73] Assignee: Conoco Inc., Ponca City, Okla.

[21] Appl. No.: 886,851

[22] Filed: Jul. 18, 1986

[51] Int. Cl.⁴ .................. C10B 49/04; C10B 57/00
[52] U.S. Cl. .................................. 202/99; 201/17; 201/29; 201/34; 201/39; 202/215; 202/228
[58] Field of Search .............. 202/95, 99, 108, 109, 202/121, 215, 222, 228, 262; 201/29, 34, 39, 17; 34/168, 169, 174, 233; 422/216; 432/96, 99, 249

[56] References Cited

U.S. PATENT DOCUMENTS

| | | | |
|---|---|---|---|
| 914,598 | 3/1909 | von Morsey-Picard | 34/174 |
| 1,551,965 | 9/1925 | Muller | 34/174 |
| 2,706,343 | 4/1955 | Oholm | 34/174 |
| 2,743,216 | 4/1956 | Jahnig et al. | 201/12 |
| 2,996,437 | 8/1961 | Mewes et al. | 202/121 |
| 3,271,268 | 9/1966 | Allred | 201/20 |
| 3,434,932 | 3/1969 | Mansfield | 201/27 |
| 3,671,401 | 6/1972 | Gorin | 201/12 |
| 3,759,795 | 9/1973 | Oliver et al. | 201/25 |
| 3,823,073 | 7/1974 | Minkkinen | 201/25 |
| 4,208,307 | 6/1980 | Lutz | 252/502 |
| 4,251,323 | 2/1981 | Smith | 201/29 |
| 4,264,415 | 4/1981 | Galow et al. | 202/228 |
| 4,345,896 | 8/1982 | Abernathy, Jr. et al. | 432/19 |

Primary Examiner—Barry S. Richman
Assistant Examiner—Joye L. Woodard

[57] ABSTRACT

An internally-fired vertical shaft kiln for calcining coke wherein a downwardly moving coke bed has a co-current preheat gas stream in the upper portion of the kiln and a counter-current combustion gas stream in the lower portion of the kiln. Both gases are removed at the midportion of the kiln. Combustion air is introduced to the kiln through an inclined grate at the bottom of the kiln which retains a layer of coke thereon for internal combustion. The calcined coke moves over the combusting coke layer on the grate and then through a passage to a cooling chamber where a gas stream is passed through the calcined coke for cooling. The gas stream heated in the cooling chamber can be used as the co-current gas preheat stream in the upper section of the kiln.

4 Claims, 1 Drawing Figure

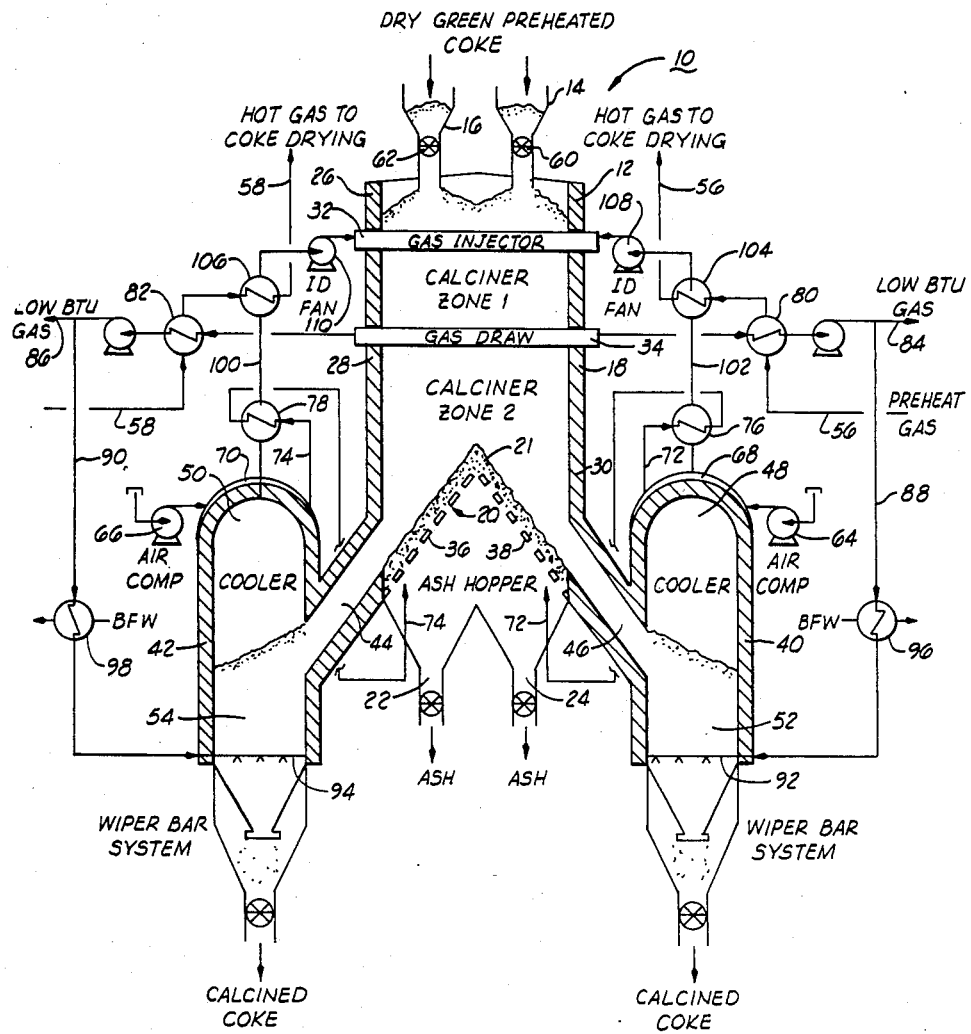

APPARATUS FOR CALCINING COKE

BACKGROUND OF THE INVENTION

1. Field of the Invention

This invention relates to calcining of delayed petroleum coke in an internally-fired vertical shaft kiln.

2. Description of the Prior Art

Delayed petroleum coke is generally calcined at high temperatures to drive off volatile hydrocarbons and moisture. The calcined product may be used to produce anodes for aluminum manufacture, and in cases where the delayed coke is of a premium quality, it can be used for manufacture of graphite electrodes useful in the electric arc steel making process. Most present-day commercial coke calciners are rotary kilns. Inclined rotary kilns and their operation are described in U.S. Pat. Nos. 4,022,569 and 4,053,365. Another rotary kiln for calcining coke is shown in U.S. Pat. No. 3,759,795.

Vertical shaft kilns have been used for calcining coke. In U.S. Pat. No. 4,251,323 delayed petroleum coke is calcined in an internally-fired vertical shaft kiln. A downwardly moving bed of green coke is preheated in the top of the kiln by rising combustion gases then heat soaked at calcining temperatures in the intermediate section of the kiln. The calcined coke is cooled in the lower sections of the kiln by recycled gas moving upwardly from the lower part of the kiln. Partially cooled calcined coke is recovered from the bottom of the kiln. In this process combustion gases, preheat gases and cooling gases all move upwardly through the downwardly moving bed of coke.

It is an object of the present invention to provide an improved method and apparatus for calcining delayed petroleum coke in an internally-fired vertical shaft kiln. More particularly, it is an object to provide such a process and apparatus with an increased calciner capacity.

It is also an object of the present invention to provide a process and apparatus for calcining delayed coke which is more efficient and reduces the number of metal and refractory components which are exposed to high flame temperatures.

Yet another object of the present invention is to provide an improved flow of the solids and gases in the coke bed of the calcining process.

SUMMARY OF THE INVENTION

According to the process of the present invention, delayed petroleum coke is calcined in an internally-fired vertical kiln having an upper section, a lower section and a midsection. Particulate green delayed petroleum coke is fed into the top of the vertical shaft kiln to form a downwardly moving coke bed to be calcined. Combustion air is introduced into the lower section of the vertical shaft kiln and creates by internal burning a calcining temperature of at least 2000° F. It also creates a stream of upwardly moving combustion gases in the downwardly moving coke bed. The combustion gases moving upwardly in the coke bed create and maintain the calcining temperatures in the lower section of the vertical shaft kiln. A hot gas stream is introduced into the upper section of the vertical shaft kiln to form a downwardly moving stream of hot gases distributed for evenly heating the coke in the upper section of the kiln. Both the upwardly moving stream of combustion gases and the downwardly moving stream of preheat gases are removed from the downwardly moving coke bed at the midsection of the vertical shaft kiln. Thus, the preheat gases move downwardly co-current with the coke bed and the combustion gases move upwardly countercurrent to the coke bed.

The lower section of the vertical shaft kiln includes an inclined grate which supports a layer of coke undergoing combustion with air that passes upwardly through the grate. The inclination of the grate is such that a layer of coke from approximately 0.5 to approximately 4 feet thick is retained on the grate as the bulk of the coke bed moves along the slip plane above the combustion coke layer. In this manner, the highest combustion temperatures are contained in the coke layer above the grate and away from the metal and refractory parts of the kiln. Calcination of the coke occurs in the moving zone of coke above the combusting coke layer.

From the calcining zone, coke moves to a cooling chamber which is separated from the vertical shaft kiln by an inclined passage which extends from the calcining zone to the cooling chamber. The calcined coke in the cooling chamber is cooled by a gas stream which is conveyed through the cooling chamber. This gas stream for cooling can be obtained from the gases removed from the midportion of the vertical shaft kiln and can be conveyed for preheat to the gas stream introduced at the top of the vertical shaft kiln. It is desirable to preheat the combustion gases introduced through the grate at the bottom of the vertical shaft kiln by conveying these gases through a heat exchange conduit which cools the refractory lining of the cooling chamber. This extends the life of the cooling chamber and desirably preheats the combustion gases introduced through the grate.

An apparatus in accordance with the present invention includes a kiln having a vertical kiln shaft with means for introducing the gas streams as described above. The lower section of the kiln includes an inclined grate for holding a layer of coke from the downwardly moving coke bed as described. A cooling chamber is connected to the lower section of the shaft by an inclined passage which extends from the inclined grate to receive the coke by gravity feed. Beneath the grate a means for receiving ash from the coke bed can be provided.

For a further understanding of the invention and further objects features and advantages thereof, reference may now be had to the following description taken in conjunction with the accompanying drawing.

BRIEF DESCRIPTION OF THE DRAWING

The drawing illustrates a schematic view of the method of the present invention.

DESCRIPTION OF PREFERRED EMBODIMENTS

As described in U.S. Pat. No. 4,251,323, there are inherent advantages in calcining delayed petroleum coke in a vertical shaft kiln. One important advantage is that the internally-fired vertical shaft kiln does not require any added fuel, whereas the conventional rotary kiln calcining process requires the addition of a large amount of fuel. Another advantage is that the heat losses from a shaft kiln are much lower than those from a rotary kiln. The present invention shares those advantages with the process described in U.S. Pat. No. 4,251,323. This patent also indicates that calcining petroleum coke in a shaft kiln has various problems. One of these problems is that the high temperatures required in the vertical shaft kiln cannot be tolerated by metals and, therefore, many types of internal devices are not possible. Another problem is that fine particles are often entrained in kiln off gas and can foul the gas handling equipment. Yet another problem is that refluxing of heavy oils volatized in the coke can occur in the upper part of the kiln. The present invention shares these advantages and solves the problems described in U.S. Pat. No. 4,251,323 and, therefore, the disclosure of U.S. Pat. No. 4,251,323 is hereby incorporated by reference herein.

Referring now to the drawing, the process of the present invention is illustrated schematically. A vertical shaft kiln in which the process is performed is shown generally at 10. The central portion 12 of the kiln 10 is shown schematically in cross section. The central portion 12 of the kiln 10 includes feed hoppers 14 and 16, a vertical coke conveying shaft 18, an inclined grate 20 and ash hoppers 22 and 24. The vertical shaft 18 can be of any desired shape in a horizontal cross section, for example, cylindrical or rectangular.

The vertical shaft 18 has an upper section 26, a midsection 28 and a lower section 30. A gas injector 32 is provided in the upper section of the shaft 18 and a gas draw 34 is provided in the midsection 28 of the shaft 18. Each of the injector 32 and the draw 34 comprise a manifold which extends across the interior of the kiln with openings spaced evenly about the kiln so that gases can be injected or withdrawn uniformly through the interior of the kiln. If needed these conduits can be jacketed to provide a cooling fluid path therein and can have stiffening members inside the jackets to provide strength to support the weight of the coke bed moving in the kiln.

The grate 20 at the bottom of shaft 18 has two inclined portions 36 and 38 which meet at a peak in the horizontal center of the lower section 30 of the shaft 18. The grate 20 is reinforced to bear the weight of the coke bed and, if necessary, can include cooling conduits therein to prevent heat damage to the metal of the grate. The grate 20 is provided to allow combustion air to enter the bottom of the shaft 18 and to allow ash to fall into the ash hoppers 22 and 24. A layer of combusting coke 21 is retained on the grate 20.

Cooling chambers 40 and 42 are provided adjacent to the shaft 18 and are connected to the lower section 30 of the shaft 18 by inclined passages 44 and 46, respectively. The passages 44 and 46 extend from and are sufficiently above the inclined grate portions 36 and 38 to retain the layer of combusting coke. In this manner, calcined coke can move by gravity from above the combusting layer retained on the grate portions 36 and 38 into and through the passages 44 and 46. The calcined coke can thus move by gravity from the kiln shaft 18 above the portions 36 and 38, through the passages 44 and 46 and into the cooling chambers 40 and 42.

The chambers 40 and 42 include both upper and lower sections. The upper sections 48 and 50 extend above the entrances of the passages 44 and 46. The lower sections 52 and 54 extend below. Wiper bar systems such as those described in U.S. Pat. No. 4,251,323 are provided in the lower sections of the cooling chambers 40 and 42 to regulate the rate at which coke exits the chambers 40 and 42. Since coke is gravity fed through the vertical shaft kiln 18 and the cooling chambers 40 and 42, the wiper bar systems control the rate of flow of the coke bed in the kiln 10. Calcined coke exits through openings in the bottom of the chambers 40 and 42.

The operation of the kiln 10 and the process of the present invention will now be described.

Green delayed petroleum coke is fed on a batch or a continuous basis to the feed hoppers 14 and 16. Preferably the green coke has been dried in a green coke storage silo or in the feed hoppers 14 and 16. Hot gas streams 56 and 58 are provided for drying the green coke and for preheating it to a temperature in the range of about 250° F. to about 350° F. The coke drying is preferable since it provides a more stable kiln operation, improves the flow characteristics of the coke and reduces corrosion in the green coke handling equipment.

The dry green preheated coke enters the kiln shaft 18 through a sealing device such as the rotary valves 60 and 62 shown in the hoppers 14 and 16. As the dry green coke enters the kiln shaft 18, it forms a particulate moving bed of material from the upper section 12 of the shaft 18 to the bottom of the cooling chambers 40 and 42. By actuating the wiper bar systems in the bottom of the cooling chambers 40 and 42, the coke bed moves by gravity downwardly through the shaft 18 and out of the bottom of the cooling chambers 40 and 42. Preferably the rate of flow through the kiln is in the range of from about 2.5 to 5 tons per day of green coke per square foot of kiln cross section. This rate of flow is possible due to the configuration of gas flow which is described in more detail below.

Air or oxygen for internal-fired combustion enters the system through air compressors 64 and 66. The composition of the air or oxygen is dependent upon the desired calcining temperature and the amount of preheating of the air which is available. The air is first preheated in heat exchange conduits 68 and 70 which extend over the cooling chambers 40 and 42. These heat exchange conduits 68 and 70, not only preheat the combustion air streams 72 and 74, they also provide cooling to the upper sections of the cooling chambers and help provide longer life for the refractory lining of cooling chambers. The combustion air streams are further heated in heat exchangers 76 and 78 and are then conveyed to the space beneath the grate 20.

The preheated air thus enters the coke bed through the grate 20. By means of the inclination of the grate 20 and the characteristics of the grate 20, a layer 21 of coke is retained above the grate surface. Preferably the design is such that the layer 21 retained on the grate 20 is from about one-half foot to about 4 feet thick. The combustion air enters the layer of coke 21 and combustion occurs therein. This combustion is, thus, away from the metal parts of the grate 20.

The combustion gases produced as a result of the combustion heat the downwardly moving coke bed in the lower section 30 of the kiln shaft 18 to the range of about 2000° F. to about 3000° F. This temperature is satisfactory to produce calcining of the delayed petroleum coke in this area of the kiln.

The amount of air injected to achieve the desired calcining temperature varies according to the amount of the preheating of the air or oxygen used, the rate of flow of the coke bed, kiln design and other factors. However, because of the configuration of the apparatus as described herein, the rate of gas flow upward through the calcining zone in the present invention is lower than would be required in utilizing other apparatus configurations. Preferably the amount of air injected is between 5 and 30 pound moles per ton of dry green coke and most preferably between 10 and 25 pound moles per ton of dry green coke.

The combustion gases produced from the internal combustion above the grate 20 are distributed uniformly through the lower section 30 of the kiln shaft 18 and move upwardly through the downwardly moving coke bed. These upwardly moving combustion gases are withdrawn from the kiln shaft 18 by means of the gas draw 34. They are cooled in heat exchangers 80 and 82 and can be used as a source of low BTU gas provided in streams 84 and 86. That portion of the gas draw stream which is not utilized as low BTU gas is conveyed by streams 88 and 90 to the bottom of cooling chambers 40 and 42. Gas injectors 92 and 94 extend across the bottom of cooling chambers 40 and 42 to allow the gas from streams 88 and 90 to be injected for cooling into the cooling chambers 40 and 42. The temperature of the gas entering the cooling chambers 40 and 42 can be adjusted by heat exchangers 96 and 98.

The cooling chambers 40 and 42 are partially filled with calcined coke which has passed from the kiln shaft 18 through the passages 44 and 46 into the cooling chambers 40 and 42. The gas injected through the injectors 92 and 94 moves upwardly through the coke bed in the lower portion of the cooling chambers 40 and 42. It then passes through the upper sections 48 and 50 of the cooling chambers and forms streams 100 and 102 as they exit the top of the cooling chambers 40 and 42. The hot gas streams 100 and 102 exchange heat in heat exchangers 76 and 78 and then in heat exchangers 104 and 106. Following this cooling the streams 100 and 102 are injected into the upper section 26 of the kiln shaft 18 by means of the gas injector 32. Fans 108 and 110 are provided for the injection of these hot gas streams into the upper end of the kiln shaft 18.

The hot gas injected in the gas injector 32 moves downwardly co-current with the downwardly moving coke bed in kiln shaft 18. This downwardly moving hot gas preheats the coke bed and then is removed in the gas draw 34.

It can be seen that a first zone of co-current, downwardly moving gas and coke is created between the upper section and midsection of the kiln shaft 18. A second zone of counter-current gas and coke is created between the lower section and midsection of the kiln shaft 18. By controlling the rate of gas flow, combustion and coke movement, an especially desirable calcining process is obtained in this manner. Coke enters the top of the coke shaft at approximately 250° F. and is preheated by the hot gas injection to approximately 1100° F. at the gas draw 34. The co-current motion of the gas and coke in zone 1 prevents refluxing of heavy oils volatized from the coke. It also prevents carry over of any heavy oils. Tar, which would otherwise be refluxed or carried over, is carbonized on the surface of the coke particles. Coke fines which would otherwise be free in the upper section of the kiln are captured and immobilized on the carbonized tar on the coke particle surfaces. Trapping of the coke fines on the larger particles reduces the pressure drop in the lower section of the kiln. Also, the gas streams are relatively free of fines and heat exchanger fouling is minimized.

The counter-current motion of the combustion gases and coke in zone 2 of the kiln easily allows the calcining temperature to be reached and provides a uniform temperature distribution resulting in a uniformly calcined product.

The pressures in the cooling chambers 40 and 42 are preferably adjusted so that gas does not flow up the passages 44 and 46. If any gas flow occurs, it is desirable to have only a minor amount of combustion gas moving from the kiln shaft 18 to the cooling chambers 40 and 42. In this manner, the cooling chambers are isolated from the kiln shaft and the cooling gases which are circulated through the cooling chambers 40 and 42 do not waste energy from the kiln shaft 18.

Startup of the system is greatly simplified by filling the kiln shaft 18 with coke and igniting the coke above the grate 20 with a startup burner. If desired, supplemental fuel can be introduced into the coke layer above the grate by introducing fuel into the grate area.

Ash from the combustion of the fuel above the grate simply falls through the grate into the ash hoppers 22 and 24 and can be easily removed utilizing rotary valves at the bottom of the ash hoppers.

Thus, the process of the present invention is well adapted to obtain the objects and advantages mentioned as well as those inherent therein. While presently preferred embodiments of the present invention have been described for the purpose of this disclosure, numerous changes can be made by those skilled in the art, which changes are encompassed within the spirit of this invention as defined by the appended claims.

What is claimed is:

1. An apparatus for calcining delayed petroleum coke comprising:
   a vertical shaft kiln having an upper section, a midsection and a lower section;
   means for introducing delayed petroleum coke into the upper section of said shaft kiln for forming a downwardly moving coke bed therein;
   means for introducing a stream of downwardly moving hot gas in said upper section of said shaft kiln;
   an inclined grate disposed in said lower section of said shaft kiln for supporting said downwardly moving coke bed in said shaft kiln;
   means for introducing preheated combustion air through said grate to create by internal burning in said kiln a calcining temperature of at least 2000° F. and to create a stream of upwardly moving combustion gases in said downwardly moving coke bed;
   means for removing said upwardly moving stream of combustion gases and said downwardly moving stream of hot gases at said midsection of said shaft kiln;
   a cooling chamber connected to said lower section of said shaft kiln by an enclosed inclined passage which extends from said inclined grate so that coke which has moved over said grate will move by gravity downwardly into said cooling chamber;
   heat exchange conduit means extending over a top of said cooling chamber for passing said combustion air therethrough to preheat same and to cool the top of said chamber;
   means for cooling calcined coke in said cooling chamber by passing a cooling gas stream therethrough; and
   means for discharging cooled calcined coke from the cooling chamber.

2. The apparatus of claim 1 wherein said means for cooling also includes means for recycling gases removed at said midsection of said shaft kiln to form said cooling gas stream.

3. The apparatus of claim 1 which further comprises:
   means for receiving ash from said coke bed disposed beneath said grate.

4. The apparatus of claim 1 which further comprises:
   means for recycling at least a portion of said gases removed at said midsection of said shaft kiln to form a portion of said hot gas stream introduced in said upper section of said shaft kiln.

* * * * *